(12) United States Patent
Breur (10) Patent No.: US 11,530,016 B2
(45) Date of Patent: Dec. 20, 2022

(54) COATING FOR LONG TERM FLOW CONTROL AROUND MARINE OBJECTS

(71) Applicant: Innovalue B.V., Hoofddorp (NL)

(72) Inventor: Hendrik Jacobus Arie Breur, Hoofddorp (NL)

(73) Assignee: Innovalue B.V., Hoofddorp (NL)

(*) Notice: Subject to any disclaimer, the term of this patent is extended or adjusted under 35 U.S.C. 154(b) by 56 days.

(21) Appl. No.: 16/474,084

(22) PCT Filed: Dec. 22, 2017

(86) PCT No.: PCT/EP2017/084318
§ 371 (c)(1),
(2) Date: Jun. 27, 2019

(87) PCT Pub. No.: WO2018/122151
PCT Pub. Date: Jul. 5, 2018

(65) Prior Publication Data
US 2020/0122808 A1    Apr. 23, 2020

(30) Foreign Application Priority Data
Dec. 27, 2016   (NL) .................................... 2018082

(51) Int. Cl.
*B63B 1/36* (2006.01)
*F15D 1/12* (2006.01)
(Continued)

(52) U.S. Cl.
CPC ............... *B63B 1/36* (2013.01); *F15D 1/003* (2013.01); *F15D 1/12* (2013.01); *B63B 1/34* (2013.01); *B63B 2231/40* (2013.01); *Y02T 70/10* (2013.01)

(58) Field of Classification Search
CPC .. B63B 1/34; B63B 1/36; B63B 59/04; B63B 2231/40; Y02T 70/10; F15D 1/003; F15D 1/0045; F15D 1/12
See application file for complete search history.

(56) References Cited

U.S. PATENT DOCUMENTS 1,903,823 A * 4/1933 Lougheed ............... B64C 21/10
244/200
1,909,186 A * 5/1933 Lougheed ................. B64C 3/14
244/200
(Continued)

FOREIGN PATENT DOCUMENTS

DE        4440105 A1 * 5/1996 ............. B64C 21/10
DE       19704207       8/1998
(Continued)

*Primary Examiner* — Ajay Vasudeva
(74) *Attorney, Agent, or Firm* — NV. Nederlandsch Octrooibureau (57) ABSTRACT

The invention pertains to the use of an easy-to-clean soft fiber-coated material on the underwater surface of structures to mimic mammal pelage and as such reducing residual drag, wherein said material comprises or consists of fibers having an average fiber length between 0.3 and 4 mm, and an average fiber thickness between 5 and 80 μm. The underwater surface of structure is preferably the hull of a movable or moving vessel, or the underwater part of a static structure such as offshore wind monopiles and off-shore rigs. In some embodiments, the invention pertains to the reduction of fuel consumption of a nautical vessel passing through water.

19 Claims, 4 Drawing Sheets

(51) Int. Cl.
*F15D 1/00* (2006.01)
*B63B 1/34* (2006.01)

(56) References Cited

U.S. PATENT DOCUMENTS

| | | | | |
|---|---|---|---|---|
| 2,322,632 | A * | 6/1943 | Harper, Jr. | ............ B64C 21/10 |
| | | | | 244/200 |
| 3,554,154 | A | 1/1971 | Thomas | |
| 5,618,588 | A | 4/1997 | Alm | |
| 7,059,662 | B1 * | 6/2006 | Drews | ................... B62D 35/00 |
| | | | | 296/180.1 |
| 7,318,619 | B2 * | 1/2008 | Munro | .................. H01Q 1/005 |
| | | | | 296/180.1 |
| 8,278,226 | B2 * | 10/2012 | Breur | ..................... B63B 59/04 |
| | | | | 442/123 |
| 10,830,261 | B2 * | 11/2020 | Castillo | .................. F15D 1/003 |
| 2005/0061221 | A1 | 3/2005 | Paszkowski | |
| 2010/0227111 | A1 | 9/2010 | Breur | |
| 2011/0070421 | A1 | 3/2011 | Zdenek | |

FOREIGN PATENT DOCUMENTS

| | | | | |
|---|---|---|---|---|
| DE | 19704207 A1 * | 8/1998 | | .............. B63B 1/34 |
| DE | 10052022 | 5/2002 | | |

\* cited by examiner

COATING FOR LONG TERM FLOW CONTROL AROUND MARINE OBJECTS

FIELD OF THE INVENTION

The invention pertains to artificial fur that smoothens the water flow around objects that are submerged in water.

BACKGROUND OF THE INVENTION

Submerged (marine) objects, whether static and experiencing water flow around or sailing in static or flowing water, experience forces from the water surrounding them. Hydrodynamicists have been trying to minimize these forces by changing the surface characteristics of the surfaces. Often, nature has been looked at for this purpose. Best known example is the so called "shark-skin effect" (e.g. Bechert, D., Bruse, M., Hage, W. et al. Naturwissenschaften (2000) 87: 157. doi:10.1007/s001140050696). Another example is the creation of a very slippery surface as a kind of "ultimately smooth surface" mimicking the slippery skin of fish (e.g. Yang Wu et al., *Biomimicking lubrication superior to fish skin using responsive hydrogels*, NPG Asia Materials (2014) 6, e136). It is mostly fully submerged animals which are mimicked. For these animals, besides the hydrodynamical shape of the body, frictional resistance over the skin is dominant. However, at the surface, wave resistance is much more important than skin friction. When swimming submerged, drag decreases 4 times because of the depletion of wave drag.

For different purposes, fiber-coated materials have been used on occasion on marine objects to change the properties of the surface in relation to the environment.

WO1993025432A1 teaches about the use of fiber flock with a high density of thin, short fibers, as antifouling on marine constructions. It mentions a density of 50-300 fibers/mm$^2$, a fiber thickness of less than 0.1 mm, and a fiber length of 0.5-5 mm. However, comparative example II of patent WO 2007/108679 shows that based on density only short fibers are used and the antifouling performance of such surfaces is limited. Instead, WO 2007/108679 describes a fiber-coated marine material having antifouling properties based on relatively short and thick fibers, which are characterized as being "thorn-like". These should still allow for some fiber motion, while it is said that spores, zoospores or larval organisms of algae and shellfishes generally settle particularly to relatively hard and scarcely moving matter. No record of use of these antifouling fiber coatings for other purposes is mentioned. However, for pragmatic reasons the current practice of vessel hulls is moving from antifouling towards cleaning-when-needed. Cleaning with remotely operated vehicles is taking the place of dive cleaning and the process becomes more and more efficient. This development increases the need for surfaces that are easy to clean.

Incidentally, fiber flocks have also been described for changing flow properties in the prior art. Albeit with a focus on aerodynamics rather than hydrodynamics, U.S. Pat. No. 7,318,619 describes the application of flocking coupled to a surface having an airflow there over to adjust an aerodynamic characteristic relative to a surface that is devoid of flocking—including reducing drag and noise. U.S. Pat. No. 7,318,619 reports increased lift and decreased drag at high angles of attack using a NACA 2412 aerofoil flocked with fibers of length 0.5, 1.0 and 2.5 mm. However, it also shows that at zero angle of attack the drag coefficients $C_D$ measured for the aerofoils covered with fibers—compared to a bare aerofoil—is 40% higher for the 0.5 mm long fiber ($C_D$ 0.7 vs. $C_D$ 0.5 for smooth foil), 60% higher for the 1.5 mm long fiber ($C_D$ 0.8 vs. $C_D$ 0.5 for smooth foil) and 80% higher for the 2.5 mm long fiber ($C_D$ 0.9 vs. $C_D$ 0.5 for smooth foil). Moreover, the fibers are only applied on the lift-side of the airfoil whereas for a vessel, it is the other side that is mostly dominated by friction drag instead of by lifting forces. Based on that information, a skilled person would not extrapolate the findings on aerodynamics to improving hydrodynamics involved in waterborne vessel movement which sails at an angle of attack of zero degrees. In fact, if anything, it would teach the skilled person away, expecting higher drag coefficients for a fiber-coated waterborne vessel compared to one devoid of flocking.

U.S. Pat. No. 3,554,154 describes a boat which has a multiplicity of bristles projecting from its outer surface below the water line, the bristles being sufficiently close together to dampen cavitation vortexes produced by movement of the boat through water. The effect of cavitation is caused by pressure decrease below the vapor saturation pressure for the given temperature. According to this document, covering the outer surface of the boat with bristles dampens the cavitation effect and reduces the friction generated by movement of the boat through the water. However, for the expert it is clear that flow properties of a hull above the cavitation point are markedly different from (normal) flow properties below the cavitation point. Cavitation is important for propeller and appendages but has little bearing on drag for vessel movement where such pressure-lowering conditions are not present.

DE19704207 describes the reduction of the water resistance (skin friction) of a floating body by coating its outer surface with a fiber pattern, with the fibers laid flat. Conductors are incorporated into the support layer for the fibers to apply a positive charge which is opposite to the charge in the water. The high voltage is applied by a control system which has a magnesium cathode. The positive charge can be applied either by wires embedded into the adhesive layer of the fibers or by using a conducting adhesive. The fibers are laid into the required pattern during application by rollers. In DE19704207 it is also described that the structure alone with the fibers perpendicular to the flow or possibly inclined, gives a resistance-reducing effect based on the fact that the fibers create small vortices that function as an air cushion/air lubrication. Air lubrication is a known concept of reducing skin friction resistance. A thin layer of air on the hull can substantially lower the skin friction owing to the lower viscosity of the air as compared to water. The air layer works as a lubricant, like in air-bearings, in this case between the hull and the water. However, the shape of most ship hulls will naturally lead to the fast escape of the air cushion, and constant air replenishing (bubble-injection) would be needed to maintain such air layer. This does not appear to be an energy-saving mode.

At the 21st International Flock Symposium in Munich in 2011, Hofmann describes flocked surfaces that reduce skin friction based on air entrapment (air lubrication). However, air entrapment can modify the rate of air replenishing but will not eliminate the need of continuous air supply. Hence, a passive system relying just on entrapped air (e.g. within the flock) will lose its effect shortly after the vessel is brought into movement.

None of above teaches the reduction of the accumulated forces on the submerged (marine) object. If anything, the art teaches an increased friction resistance, generally leading away from applying fibers on moving objects in water.

SUMMARY OF THE INVENTION

As most man-made structures reside at the water surface, the current invention rests in mimicking of the marine mammal skin to improve the hydrodynamics of said structures. Mammals often swim at the surface and deal with the predominant drag forces efficiently. Mimicking of the marine mammal pelage to improve overall hydrodynamics is an entirely new approach as such and where the art discusses effects of length, the effect of stiffness (compare bristles versus fur) is not addressed. The inventor has unexpectedly found that, when applying soft fiber flock materials having an average fiber length of 0.3-4 mm and average fiber thickness of 5-80 microns on underwater structures, such as the hull of movable or moving vessels, or underwater static structures such as offshore wind monopiles and off-shore rigs, where the angle of attack of the water flow ($W_f$ see FIG. 3A-3B) is inherently 0-degrees, overall drag is not negatively influenced and as (skin) friction is increased markedly, these fiber flock materials have excellent residual drag reduction properties that can even lead to the reduction of the total drag.

It is shown in the examples that thinner fibers have a decreased friction resistance compared to thicker fibers, and longer fibers have a higher surface friction compared to shorter fibers, thus rendering a tool for optimizing flow properties based on fiber length and diameter. Also, since the effects of a surface structure only prevail as long as the surface is free of fouling, it is important to keep fouling away or it is easy to clean in case fouling arises. The inventor has found that the these two objects can be merged when working with the fiber lengths and thickness and optionally thickness-to-length ratios of the invention. The fibers are easy to clean.

In one embodiment, the structure is a moving or (self-) moveable nautical vessel. Associated therewith, the invention pertains to the reduction of fuel consumption of a nautical vessel passing through water. In another embodiment, the structure is a static structure such as offshore wind monopile or off-shore rig.

In a related aspect, the invention pertains to a fiber-coated material on the underwater surface of a structure such as a movable or moving nautical structure or a static structure such as offshore wind monopile or off-shore rig, for reducing residual drag, wherein said material comprises or consists of fibers having an average fiber length and average fiber thickness as defined in the specification and accompanying claims.

The fiber-coated material has improved cleanability properties, i.e. is preferably easy-to-clean.

DETAILED DESCRIPTION OF THE INVENTION

Figure 3A:
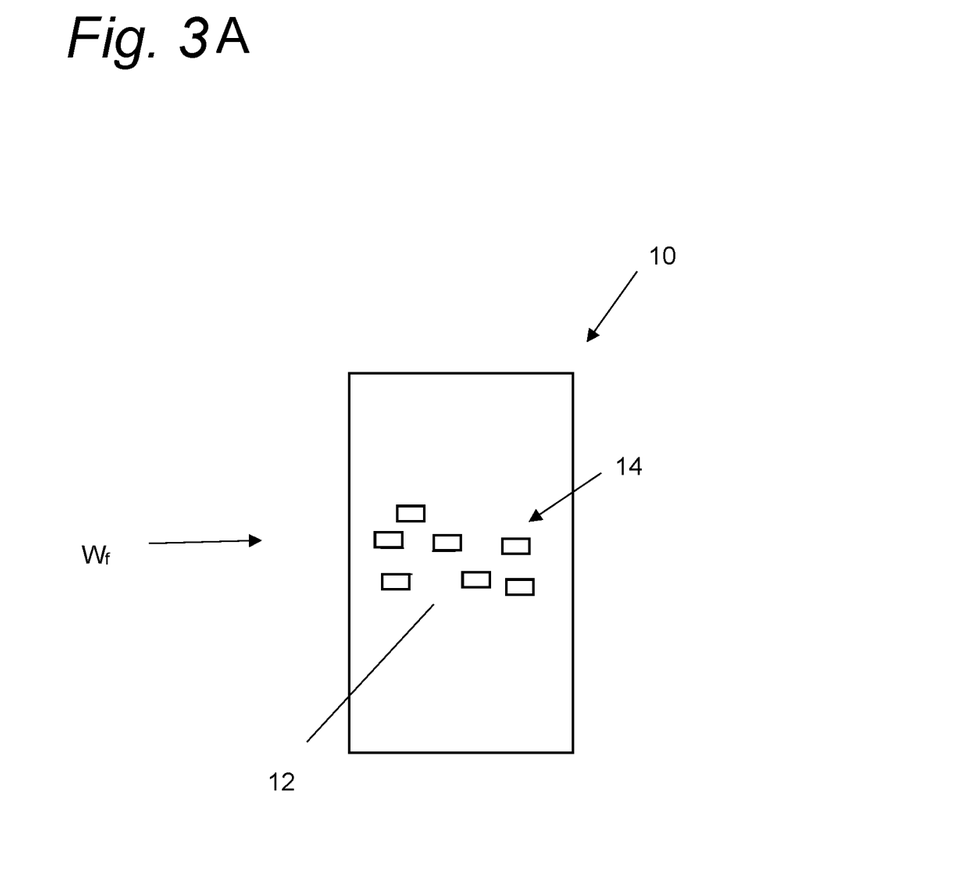
FIG. 3A shows a schematic bottom view of an underwater structure 10, which could be static (g.g, offshore wind monopoles or rigs) or movable (e.g., vessels), with a fiber-coated material 12 with some fibers 14 schematically shown.
Figure 3B:
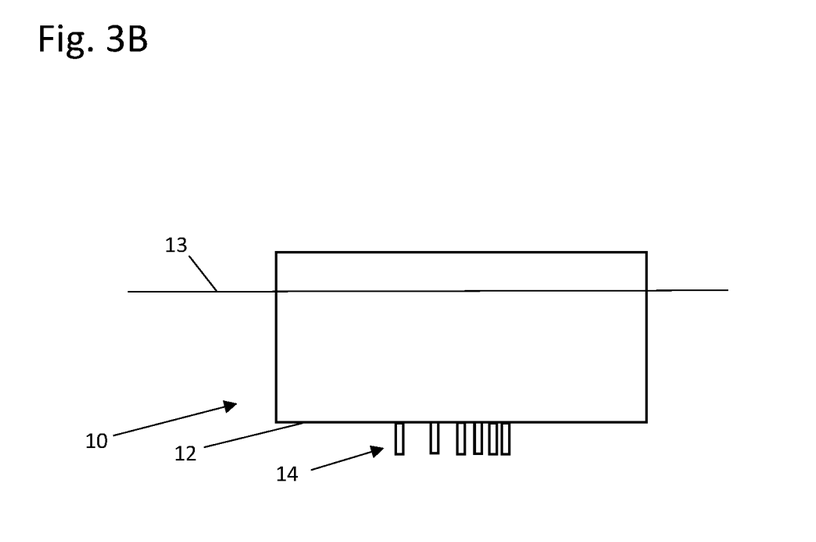
FIG. 3B shows a schematic side view of an underwater structure 10, with the waterline 13, which could be static (g.g, offshore wind monopoles or rigs) or movable (e.g., vessels), with a fiber-coated material 12 with some fibers 14 schematically shown.

In one aspect, the invention pertains to the use of fiber-coated material 12 on the underwater surface of a structure 10 for reducing (hydrodynamic) residual drag, wherein said material comprises or consists of fibers 14 having an average fiber length between 0.3 and 4 mm, and an average fiber thickness between 5 and 80 microns. In another aspect, the invention pertains to a method for reducing residual drag of a structure immersed in water, wherein at least part of the underwater surface of a structure is provided with a fiber coated material 12, wherein said material comprises or consists of fibers 14 having an average fiber length between 0.3 and 4 mm and an average fiber thickness between 5 and 80 microns In one embodiment, the fibers preferably have an average length between 0.5 and 3.5 mm, more preferably between 0.5 and 3 mm, more preferably less than 2.5 mm, even more preferably less than 2 mm, most preferably less than 1 mm, most preferably in the range of 0.5 to 1 mm.

In one embodiment, for sake of improved cleanability, it is preferred that the fibers have an average thickness below 80 µm, preferably below 75 µm, preferably below 70 µm, more preferably below 60 µm, more preferably below 50 µm, even more preferably below 45 µm, most preferably below 30 µm.

In one preferred embodiment, the above preferred average fiber lengths and average fiber thickness are combined. Within these ranges, the actual combination of average thickness and length may be selected depending on the optimum of drag and cleanability for a particular application. In another embodiment, for sake of improved cleanability, the average fiber length is preferably at least 1 mm, more preferably at least 2 mm, most preferably between 2 and 4 mm, more preferably at least 2.5 mm, and preferably has an average fiber thickness as defined here above. The improved cleanability for these longer fibers is however less advantageous to residual drag reductions. If—within the ranges of the invention—it is more important to tackle residual drag problems, the average fiber length is preferably below 3.5 mm, more preferably below 3.0 mm, most preferably below 2.5 mm, even more preferably below 2.0 mm. With lower fiber lengths, cleaning will require more attention.

Within the aforementioned ranges, the fibers according to the invention preferably have a thickness-to-length ratio (based on average fiber length and average fiber thickness) at or below 0.05, preferably below 0.04, more preferably below 0.03 (i.e. average diameter over average length). The thickness-to-length ratio is preferably at least 0.005, more preferably at least 0.009, most preferably at least 0.01.

To mimic the mammal fur, soft fibers are deposited on the surface of an object by electrostatic flocking. With this technique, chargeable fibers may be charged in a high voltage electric field between a fiber container and the (grounded) object to be flocked. Due to the electric field, the fibers flow directly to the object and the fibers are approaching perpendicular. An adhesive applied on the object catches the fibers and after a drying and crosslinking process, the fibers are stuck permanently. Fibers could be directionally flocked, to enable stream wise positioning. Fiber materials can be diverse, for example viscose, polyester and polyamide and also their dimensions and densities can vary largely. It is clear that different fibers will experience different behavior in water flow and both material as well as dimensions of the fibers (length, diameter, thickness-to-length ratio) matter. Also different mammals have different fur hairs and so to find the right fiber to optimize hydrodynamics, selection and optimization are essential.

To understand the hydrodynamical phenomen at a fiber coated surface, particularly in the light of the discouraging results in the prior art teaching away from the drag reducing properties of the fibers, one has to discern between different components of drag. The underwater part of drag essentially consists of frictional and residual drag. These drag components vary independent from one another.

Since it is only the relative motion of the fluid (water) with respect to an object that matters, everything stated about advantageous residual drag reducing effects for a body moving through a fluid automatically translates to the situation when a fluid flows around a static (underwater) structure.

The frictional drag is due to the internal viscosity of the water and originates from the shearing motion of the water volumes in the vicinity of an object. When a body moves through a fluid a boundary layer develops on its exposed surface: the fluid layer in the immediate vicinity of the solid surface is motionless with respect to the body, i.e. it is attached to the body and moves with its speed (non-slip boundary condition); the adjacent fluid layers have gradually decreasing speed until far away from the body the fluid becomes completely still. (The other way round, when a fluid moves around a static structure it slows down within the boundary layer until zero speed is attained at the surface of the structure.) The friction within the boundary layer is dictated by the viscosity of the fluid (water) and governs the frictional resistance of the body. The frictional resistance of a vessel moving through a fluid is proportional to the wetted area of the vessel hull and depends on the thickness of the boundary layer. The state and the thickness of the boundary layer changes with vessel speed and with the position along the hull taking the utmost frontal point of the vessel being the reference. At low speeds and close to the front boundary layer is laminar (diffusive transfer between the adjacent fluid layers). At high speeds and/or far from the front boundary layer becomes turbulent (convective transfer between the adjacent fluid layers associated with creation of vortices and chaotic change of fluid properties). In the art, a lot of attention has been dedicated to frictional drag and ways to reduce it.

Residual drag is mainly made up of form drag (also known as 'pressure' drag) and wave (or 'wave-making') drag:

1. In embodiments with moving nautical vessels, form drag depends on the shape of the vessel and stems from the difference in pressure at the front and at the back of the vessel. As the vessel moves through the water, the water at its front is split and forced to move around the vessel, which phenomenon is associated with a local pressure increase. Oppositely, at the back of the vessel the water reunites and fills in the void left after the vessel's passing. If this is not done efficiently, local low pressure is formed behind the vessel. The difference in these pressures acts on the vessel cross-sectional area and exerts a slowing-down force—form drag. The form drag depends on the shape of the hull and the wake formed behind the vessel. Flow separation increases the wake and decreases the efficiency with which the rear pressure is regained, thus leading to a form drag increase.

2. Wave drag (wave-making drag) relates to the formation of waves. In calm water, a wave system develops at the water surface after the passing of a vessel. Therefore, part of the energy of the vessel has been used to agitate this wave system. This is associated with a drag force—wave-making drag. The wave drag depends on the difference in the pressures at the front and the rear of the vessel, hence on the length of the vessel, the shape of the hull, but also on the viscous dissipation within the boundary layer.

Figure 1:
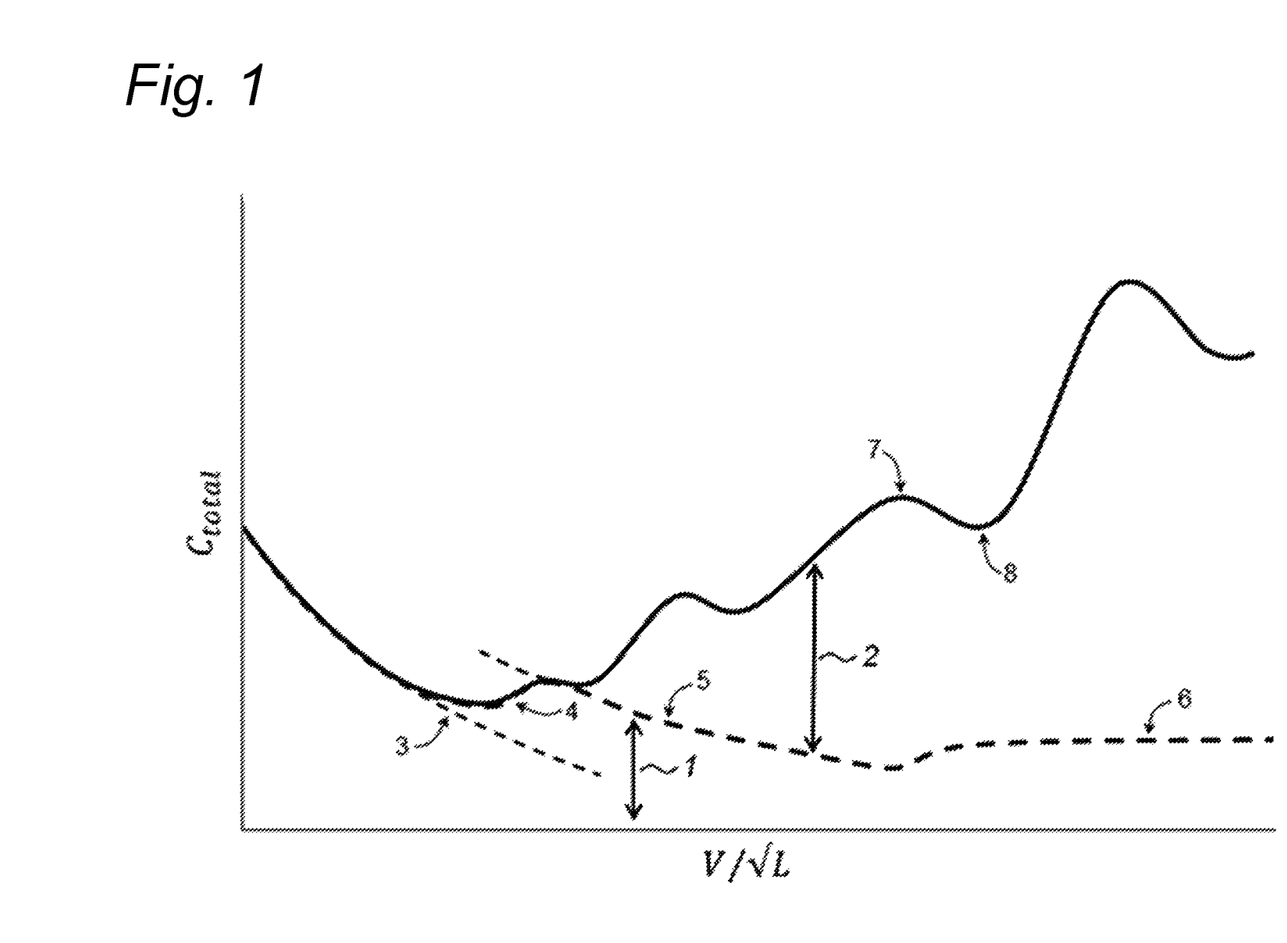
FIG. 1: Schematic diagram showing the dependence of the total drag coefficient C_total on the speed-length ratio of the vessel ($V/(\sqrt{L})$): ('1') skin friction drag coefficient, ('2') residual drag coefficient, ('3') line of laminar flow, ('4') transition to turbulence, ('5') turbulent flow, ('6') fully turbulent flow, ('7') hump in C_total due to wave-making resistance, ('8') hollow in C_total due to wave-making resistance.

FIG. 1 demonstrates the different drag components (in terms of the total drag coefficient) with regard to the speed (V)-length ($\sqrt{L}$) ratio of a waterborne vessel. At low speed-length ratios, associated also with low Reynolds numbers ($Re=\rho VL/\mu$, here $\rho$ is the density of the fluid and p its viscosity, V is the speed of the vessel with respect to the fluid, and L is the length of the vessel), frictional drag ('1') dominates. Further, frictional drag coefficient decreases with $V/(\sqrt{L})$. The total drag coefficient initially follows the same trend, but at higher $V/(\sqrt{L})$, the residual drag ('2') contribution grows and eventually predominates. At typical vessel cruise speeds, residual drag can contribute to more than 50% of the total drag experienced by the vessel.

In the inventor's findings, overall drag was neutral, as shown in examples 4, 5 and 7, and as frictional drag has increased, as shown in example 1, the residual drag must inherently have decreased.

The inventor's findings with regard to residual drag can bring about advantageously maintained or even lower overall drag properties, and associated fuel reduction, for vessels moving through water in case the fiber length and thickness are varied from the fibers in the initial findings of the inventor to decrease friction contribution while maintaining the residual drag decrease.

Example 1 shows clearly the difference in the frictional drag on fiber coated disks with different lengths and thicknesses. The shorter the fiber, the lower the friction drag; the thinner the fiber at the same average length, the lower the friction drag. These findings imply that to decrease the frictional drag, the fibers should be as short and thin as possible. However, the dimensions should be carefully selected such that the decrease in residual resistance is still present and thus, there will be a minimum value of especially the length of the fibers. As example 7 shows that for a long and slender vessel, dominated by friction drag, the drag is neutral for a 0.7 mm fiber, this is still a fiber where residual drag properties exist. The fact that for example 4 and 5 neutral drag was found for the 3 mm long and thick fiber, shows that in this length region still, depending on vessel shape, residual drag decrease can match the frictional drag increase.

For optimizing the residual drag benefits, softer fibers are preferred over more rigid fibers and shorter fibers over longer fibers. It is preferred that the average fiber thickness is in the range of 5-80 μm, more preferably 5-75 μm, particularly 5-70 μm, preferably less than 60 μm, more preferably less than 50 μm, most preferably less than 45 μm, especially preferred being 10-30 μm.

For the effects on drag to last, the surface should remain free from contamination (biological, chemical, sediment). In this aspect, a second aspect of the invention teaches the need to clean a surface easily. The fibers of the artificial pelage prevent pollution from easily reaching the surface of the insulated object. Pollution—either organic or inorganic in nature—will "foul" the top of the fibers and will create a layer of deposit at that location. This settlement on top of the fibers leaves space underneath the fouling and this space enables easy cleaning as a cleaning tool can easily be pressed in the mat of fibers to enable removal from the bottom side instead of from the top.

It was found that the length of the fiber plays an important role in the cleanability. Short fibers leave little room underneath to position cleaning tools and could even lead to firm attachment as the secreted adhesives by tropical organisms can be thick and can fully embed even a 3-4 mm long fiber. Example 6 shows the difference in cleaning between a short and long fiber type in comparable Northern European water conditions, compared to a conventional antifouling coating.

In yet another aspect, in case of idle times of vessels or structures, fouling can occur and cleanability becomes important. In these cases, longer flexible fibers are preferred over shorter as well as over thicker fibers. Example 6 compares cleanability of different fibers.

The density of the flocks of fibers ('flock density') is preferably conventional, and it rests within the skilled person's abilities to achieve practical flock densities up to about 25% coverage. To attain flock-like characteristics, a minimum density of 3% is preferred. Though there is no distinct limitation in terms of densities for which residual drag reduction is achieved, flock densities are preferably in the range of 3-25%, more preferably in the range of 5-15%.

All sorts of fiber-forming materials may be used. Both hydrophilic and hydrophobic polymers can be employed. The fibers are commonly composed of polyester, polyamide or polyacrylate, including polyesters such as poly(ethylene) terephthalate and poly(butylene) terephthalate, polyamides represented by nylon 6, 11, 12, 66 and 610, but also polyurethane, (modified) poly(vinyl alcohol), polyalkylene such as polyethylene or poly-propylene or modified (copolymerized) forms thereof. Also natural fibers such as rayon may be applied. The fibers are preferably made of synthetic fiber materials, preferably selected from the group consisting of polyester, polyamide, polyethylene, polypropylene, polyacrylate, polysiloxane, fluoropolymer, and combinations thereof. The fibers may also comprise modifications, copolymers or mixtures of the afore-mentioned types. The fibers preferably comprise polyamide or polypropylene.

In one embodiment, residual drag reduction compensates for or even supersedes frictional drag increase, preferably supersedes by at least 1%, more preferably at least 2.5%, most preferably at least 5%, thus reducing total drag.

It is preferred that at least 5%, more preferably at least 10% of the underwater part (below the waterline) of the structure, such as the hull of a vessel, is covered by the fiber flock materials. In one embodiment, it is preferred that all, preferably less than 90%, more preferably less than 80%, even more preferably less than 70%, more preferably less than 60%, preferably less than 50% of the underwater part (of the vessel hull) is covered by the fiber flock materials. This is both from an economical perspective, but also to maintain frictional drag, in case of a vessel mainly resulting from the flat bottom and vertical sides, at reasonable levels.

The present invention offers solutions to drag issues adapted to be used for either small (nautical) vessels with a predictable shallow draft and relatively short hulls or large displacement vessels, with variable drafts and long hulls. In one embodiment, the fiber flocks are applied to an object that passes through water.

The invention also offers solutions for static structures immersed in water where water flow around or through the structure exerts forces on the structure as drag is caused by the relative motion between water and structures. The use of fiber flocks advantageously reduces residual drag and the amount of force exerted on the structure. Preferred (underwater) static structures are offshore wind monopiles and off-shore rigs, but also platforms, oil rigs, mooring posts and buoys.

The invention thus pertains to fiber coated structures for use in water, wherein at least part of the surface is covered with fiber flocks with fibers having an average length of less than 4 mm to keep friction drag low, but longer than 0.3 mm to enable the decrease in residual drag. Preferably, the average fiber length is shorter, i.e. between 0.5 mm and 4 mm, preferably between 0.5 and 1.5 mm for drag optimization, preferably between 2 and 3 mm for cleanability optimization. Density and thickness of the fibers can be optimized depending on speed required or additional requirements like (but not limited to) ease of cleaning of fouling (inorganic as well as biological).

Unless specified otherwise, the values for thickness, length, density and ratios given throughout the description and claims are averages. An under- and overcut of less than 5% of the individual fibers is tolerated.

The invention can only function properly if no pollution is fouling the surface. As it is known that all surfaces will foul eventually, the best surface to obtain is an easy-to-clean surface. The invention therefore also pertains to the easy-to-clean effects of fibers. For optimization in respect of cleaning, longer and softer fibers are preferred over rigid as well as over short fibers (see example 6).

EXAMPLES

Example 1—Measurements of Frictional Resistance by a Rotating Disk Set-Up

Friction drag tests were carried out in a laboratory environment, using rotating PVC-discs, rotating in water, coated with fibers. Besides measuring a flat PVC-disc, two sets of discs are compared: short fibers with same average diameter, different average length (0.5 and 1.0 mm) and long fibers (3 mm on average) with different average diameters (27, 50 and 70 μm). The rotation speed resulting from a specified torque was measured. Several torque values were used, a characteristic torque was measured in each and every case. As there is flat plate condition, the resistance is purely friction related. Measurements were carried out at different torques.

In one characteristic measurement, the 0.5 mm length fiber covered surface resulted in a 29% decrease in rotation speed whereas the 1.0 mm length fiber covered surface resulted in a 35% reduction in rotation speed relative to the smooth PVC disk, showing that shorter fibers result in lower friction increase. In another characteristic measurement for the 3 mm length set of fibers, the 27 mm diameter fiber covered surface resulted in a 46% lower rotation speed, the 50 mm diameter fiber covered surface resulted in a 48% lower rotation speed and the 70 mm fiber covered surface resulted in a 51% lower rotation speed compared to the smooth PVC disk, showing that thicker fibers result in higher friction increase.

Example 2—Cleaning Properties

An offshore standby vessel was coated with—on average—3 mm fiber (with average fiber thickness of 44 μm) covered film and vessel was tested for 2.5 years in water, meaning idle on standby position near oil platforms and only sailing occasionally. After 2 years little fouling was present (under water inspection) and after 2.5 years the vessel was dry docked. During the dry dock, any fouling present could easily be removed. A small fraction of fouling was stuck permanently with a thick layer of adhesive penetrating through the 3 mm thick fiber layer.

Example 3—Drag

Sheets of flock fibers (average length 3 mm, average 70 µm diameter; conventional flock densities) were attached to an aluminum pilot boat and speed trials were carried out. To prevent the influence of currents and wind, speed trials were carried out in two directions. After the speed trial, the sheets were removed and the same speed trial was carried out with the smooth hull. Before each test run, the vessel was refueled. After the trial with the smooth hull, a second sheet was attached to the hull, this time comprising of short fibers (average length 0.7 mm length, 13 µm average diameter), with similar flock densities.

Tests proceeded as follows: first a desired rpm (rotation per minute) of the engine was enforced, thus fixing the power of the propulsion, followed by allowing for the vessel making a constant speed. Every 5 seconds data was recorded, including the engine-rpm, vessel's coordinates, direction and speed with respect to the surface. For a given engine-rpm the speed of the vessel was calculated as an average from two runs: one in the direction of the predominant weather conditions; and second run in the opposite direction. For each engine-rpm speed errors were calculated statistically from the individual measurements and the larger of the two runs was accepted as the relevant one.

Figure 2:
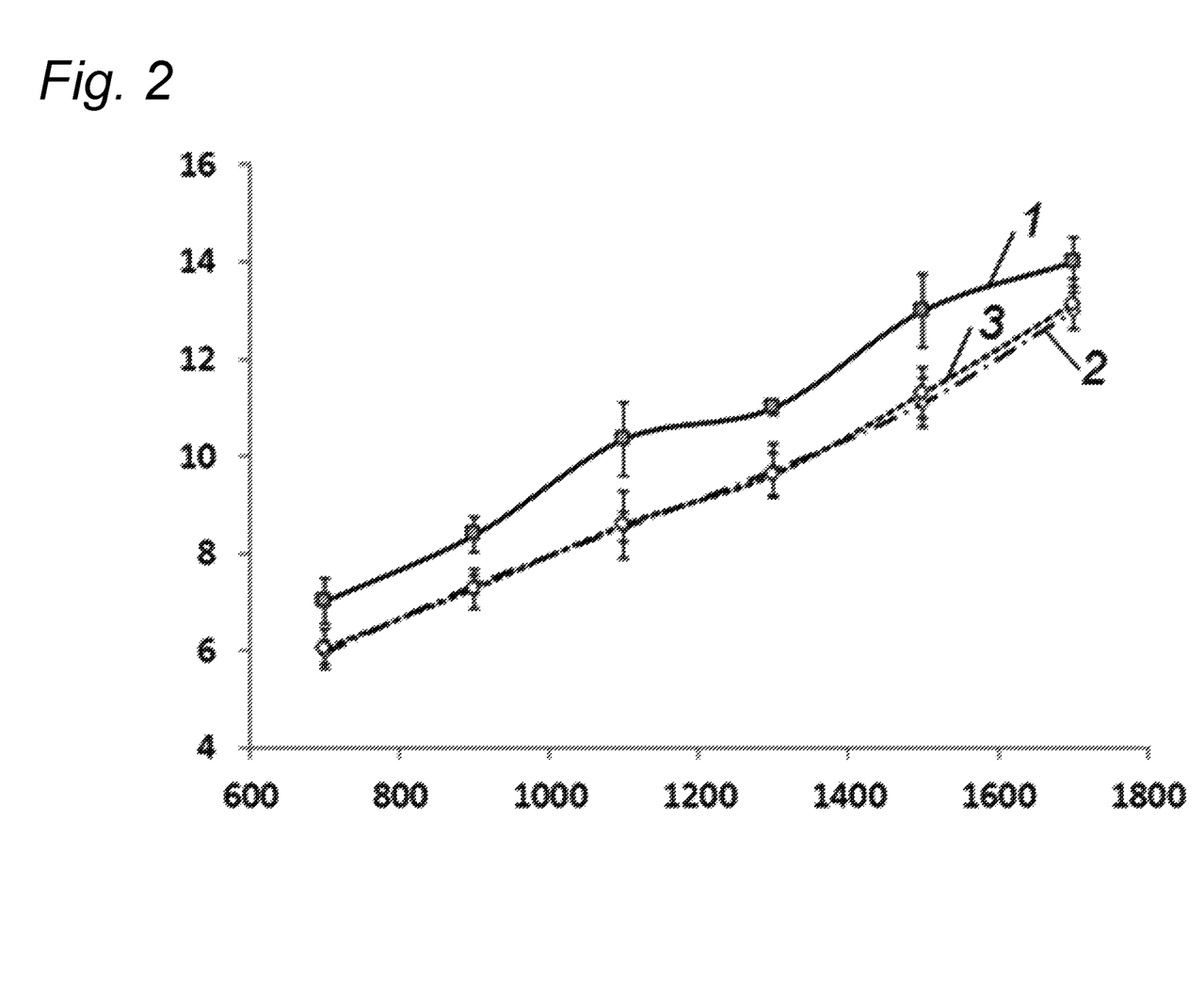
FIG. 2: The effect of the fiber flock on vessel speed (in knot) achieved at specific engine—rpm in displacement mode. Diamonds ("2') indicate results with long fibers (average length 2.5-3 mm), squares (*1') represent the short fibers (average length 0.5-1.5 mm), and the circles (*3') are obtained with the uncoated vessel surface.

FIG. 2 shows the test results. It is clear that, as long as the ship stays in displacement mode, the speed resulting from a specific engine power is the same for the smooth hull and the long fiber. Looking at the result of the short fiber, a large increase in speed is attained at the same engine power, going from an increase in speed of 7% (at high speed) to more than 20% (at lower speeds).

Example 4—Drag

Sheets of flock fibers (average length 3 mm; average 70 µm diameter, conventional flock densities) were attached to a harbor tug and a regular antifouling paint was applied to an identical harbor tug. Tugs have keel cooling channels, the length of the vessels is 19.6 m. Speed trials with both vessels were carried out to establish the maximum speed attainable. The tug with the sheets of fiber flock attained a maximum speed of 11.0 knots whereas the tug with the regular antifouling paint attained a maximum speed of 11.2 knots. Based on the outcome of the experiments in example 1, it could only be concluded that this was accomplished by a large reduction in residual drag.

Example 5—Drag

Sheets of flock fibers (average fiber length 3 mm; average 70 µm diameter, conventional flock densities) were attached to a steel crew tender of 34 m length with which speed trials with regular antifouling paint have given a maximum attainable speed of 16.0 knots. Speed trials with the vessel were carried out after application of the sheets of flock fibers to establish the maximum speed attainable. The maximum speed attained was 16.5 knots. Based on the outcome of the experiments in example 3, this was associated with a large reduction in residual drag.

Example 6—Cleaning

Sheets of flock fibers with two average fiber lengths (0.7 and 3 mm) were attached to two vessels in cold water and were inspected after 2 months (0.7 mm fiber sheet) and 1.5 years (3 mm fiber sheet). An identical vessel as the one coated with the 3 mm fiber sheet was coated with a regular antifouling paint for comparison and was used in a comparable manner for 1.5 years. All three vessels showed fouling to some extent and cleaning was performed. The short fiber needed flat metal sheet cleaning tools and was then easily cleaned by pushing the metal sheet underneath the fouling. For the long fiber sheet even after 1.5 years, cleaning was possible simply barehanded. For the regular antifouling paint, cleaning with a dive knife even resulted in removal of the entire coating system, showing the inability to clean the surface without fibers present.

Example 7—Drag

Sheets of flock fibers (average length 0.7 mm; average 14 µm diameter, conventional flock densities) were attached to a 220 m long, slender vessel with which speed trials with regular antifouling paint have given a maximum attainable speed of 21.6 knots. Speed trials with the vessel were carried out after application of the sheets of flock fibers to establish the maximum speed attainable. The maximum speed attained was 21.3 knots. Based on the outcome of the experiments in comparative example 3, with an increase in friction resistance in the range of 30-35% for this fiber, the equal speed is associated with a large reduction in residual drag for the vessel coated with the fibers.

The invention claimed is:
1. A method for reducing residual drag of a structure immersed in water, wherein at least part of the underwater surface of said structure is provided with a soft fiber-coated material, wherein said material comprises or consists of fibers having an average fiber length between 0.5 and 2.5 mm and an average fiber thickness between 5 and less than 50 µm, and wherein said fibers are attached perpendicularly to the underwater surface of the structure and configured to remain substantially perpendicular when there is relative motion between the water and the underwater surface of the structure, and wherein the angle of attack of water flow is 0 degrees and wherein water moves around said structure, wherein said fibers reduce the residual drag of the structure.
2. The method according to claim 1, wherein said underwater surface of structures is the hull of a movable or self-movable or moving vessel, or the underwater part of static structures.
3. The method according to claim 2 wherein said static structure are offshore wind monopiles and off-shore rigs.
4. The method according to claim 1, for reduction of fuel consumption of a nautical vessel passing through water.
5. The method according to claim 1, wherein the average fiber length is less than 2 mm.
6. The method according to claim 1, wherein the average fiber thickness is between 10 and 30 µm.
7. The method according to claim 1, wherein the fibers have a thickness-to-length ratio based on average fiber length and average fiber thickness at or below 0.05.
8. The method according to claim 1, wherein the fibers have a thickness-to-length ratio of at least 0.005.
9. The method according to claim 1, wherein the fiber flock density is between 3 and 25% coverage.

10. The method according to claim 1, wherein at least 5% of the submerged surface of the vessel is covered by said fiber-coated material.

11. The method according to claim 1, wherein the fibers are synthetic fiber material and are selected from polyester, polyamide, polyethylene, polypropylene, polyacrylate, polysiloxane, fluoropolymer and combinations thereof.

12. The method according to claim 1, wherein the fibers provide ease of cleaning of deposits.

13. The method according to claim 1, wherein the fibers have an average fiber length of at least 1 mm.

14. The method according to claim 1, for reducing overall drag of a nautical vessel passing through water.

15. A fiber-coated material on the underwater surface of a movable or moving nautical structure, wherein said material comprises or consists of fibers having an average fiber length between 0.5 and 2.5 mm and an average fiber thickness between 5 and less than 50 µm, and wherein said fibers are attached perpendicularly to the underwater surface of the structure and configured to remain substantially perpendicular when there is relative motion between the water and the underwater surface of the structure, and wherein the angle of attack of the water flow is 0 degrees, and wherein the fibers reduce residual drag on the nautical structure when the structure is moving.

16. The material according to claim 15, wherein the average fiber length is in the range of less than 2 mm.

17. The fiber-coated material according to claim 15, wherein the fibers have a thickness-to-length ratio (based on average fiber length and average fiber thickness) at or below 0.05.

18. The material according to claim 15, wherein the fibers have a thickness-to-length ratio of at least 0.005.

19. The material according to claim 15, wherein the average fiber thickness is between 10 and 30 µm.

* * * * *